United States Patent [19]
Bryan, Jr. et al.

[11] 3,712,023
[45] Jan. 23, 1973

[54] METHOD AND APPARATUS FOR TRANSFER RING ARTICLES

[75] Inventors: George D. Bryan, Jr., Mechanicsville; Nicholas Constantino, Richmond, both of Va.

[73] Assignee: Reynolds Metals Company, Richmond, Va.

[22] Filed: March 25, 1971

[21] Appl. No.: 128,348

[52] U.S. Cl....................................53/307, 53/282
[51] Int. Cl..........................B65b 57/02, B65b 7/28
[58] Field of Search........53/300, 307, 319, 373, 282, 53/303, 304, 306, 168; 221/211, 262

[56] References Cited

UNITED STATES PATENTS

| | | | |
|---|---|---|---|
| 2,600,138 | 6/1952 | Tesch, Jr. | 53/304 X |
| 2,954,900 | 10/1960 | Brubaker | 221/211 |
| 3,111,798 | 11/1963 | Weller | 53/306 |
| 3,293,823 | 12/1966 | Anderson | 53/282 X |
| 3,344,952 | 10/1967 | Inman | 221/221 X |
| 3,354,813 | 11/1967 | Meyer et al. | 221/211 X |
| 3,453,804 | 7/1969 | Taylor et al. | 53/319 X |
| 3,487,622 | 1/1970 | Mueller | 53/282 |
| 3,629,989 | 12/1971 | Reinecke | 53/64 |

*Primary Examiner*—Travis S. McGehee
*Assistant Examiner*—Horace M. Culver
*Attorney*—Glenn, Palmer, Lyne, Gibbs & Thompson

[57] ABSTRACT

In a container closing method and apparatus, a cover member transferring device for transferring a cover member from a first location where a supply of cover members is provided to a second location where a product filled container body is to receive the transferred cover member for closing the same. A carrier is supported by a support frame and is movable relative thereto in a fixed path from adjacent the first location to adjacent the second location. A pick-up device is suitably carried by the carrier and is movable relative thereto, the carrier having means for extending the pick-up device therefrom adjacent the first location to pick up a cover member and thereafter return the pick-up device with a cover member thereon. The carrier is moved in the fixed path so that the pick-up device is moved adjacent the second location where the pick-up device is again extended adjacent the second location for depositing the cover member on a filled container body whereby the pick-up device can thereafter be retracted to be moved back to the first location for receiving another cover member in the same manner.

4 Claims, 11 Drawing Figures

3,712,023

PATENTED JAN 23 1973

INVENTORS
GEORGE D. BRYAN, JR.
NICHOLAS CONSTANTINO
BY

THEIR ATTORNEYS

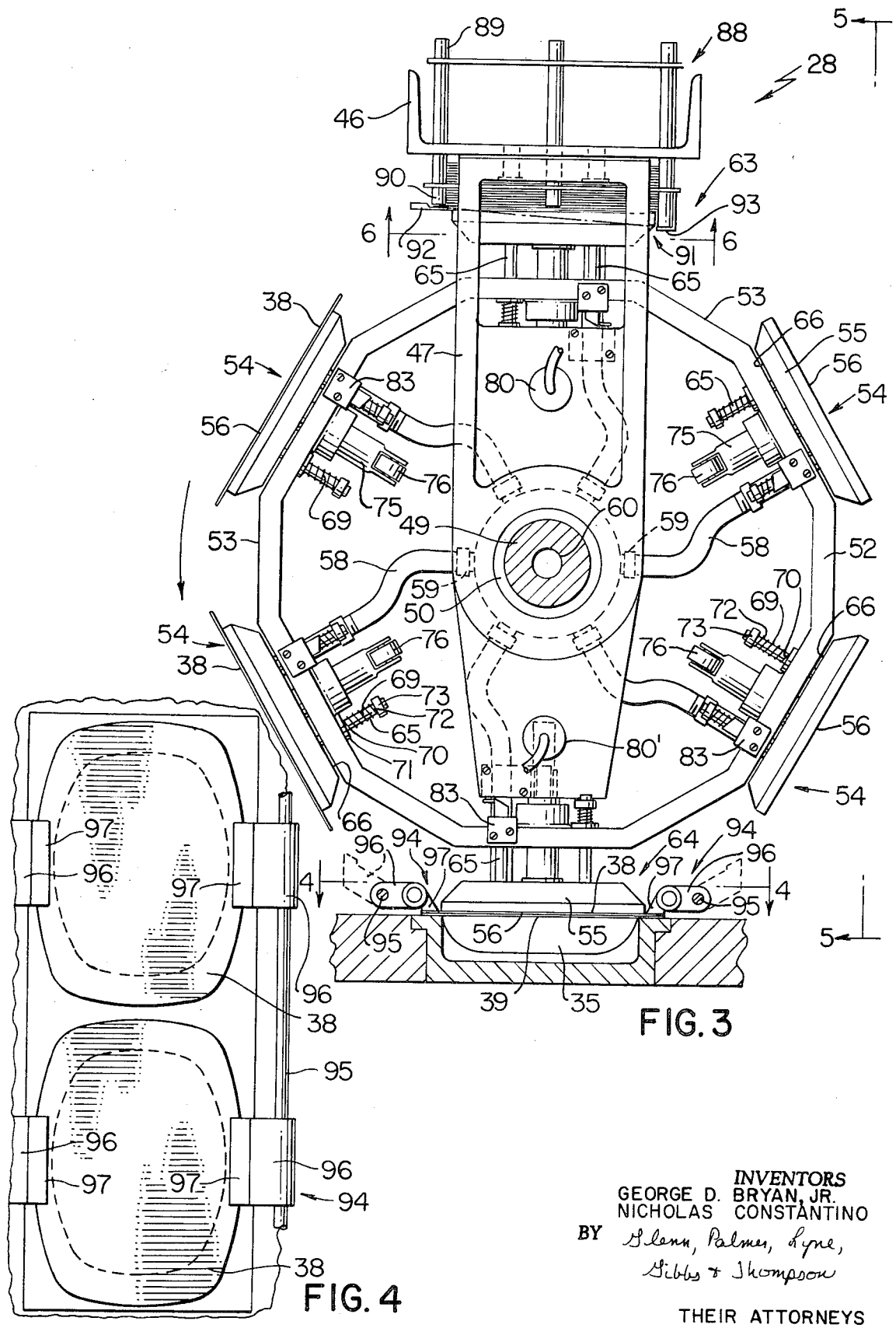

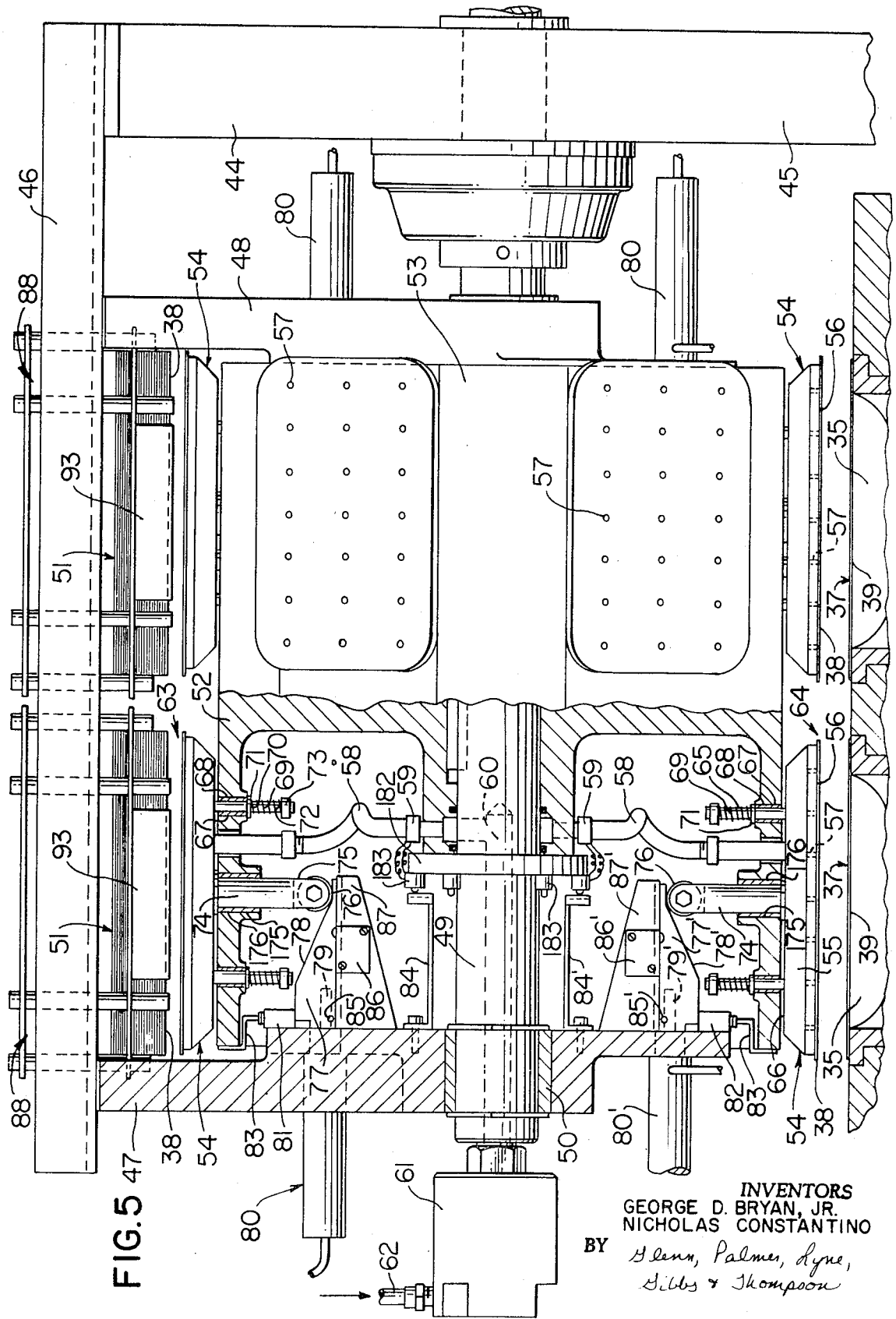

PATENTED JAN 23 1973　　　　　　　　　　　　　　　　3,712,023

INVENTORS
GEORGE D. BRYAN, JR.
NICHOLAS CONSTANTINO

BY *Glenn, Palmer, Lyne,*
*Gibbs & Thompson*

THEIR ATTORNEYS

METHOD AND APPARATUS FOR TRANSFERRING ARTICLES

BACKGROUND OF THE INVENTION

In the automatic filling and subsequent sealing of food containers and the like, suitable apparatus must be provided for transferring a cover member from a supply thereof to a particular filled container body so that such cover member can be subsequently secured in place to seal closed that particular container body.

SUMMARY

This invention provides an improved method and apparatus for transferring articles from one location thereof to another location thereof, such as cover members for product field container bodies, etc.

One embodiment of the method and apparatus of this invention provides a supporting frame and a carrier supported by the frame and being movable relative thereto in a fixed path from adjacent a first location to adjacent a second location for the purpose of transferring an article from the first location to the second location. A pick-up device is movably carried by the carrier to be movable relative thereto, the carrier having means for extending the pick-up device therefrom when the pick-up device is adjacent the first station to pick-up an article at the first location and thereafter retract the pick-up device adjacent the first location. Means are provided for moving the carrier in the fixed path so that the carrier moves the pick-up device from adjacent the first location to adjacent the second location. The carrier then utilizes the previously described means for extending the pick-up device adjacent the second station for depositing the carried article at the second location and thereafter retracting the pick-up device adjacent the second location so that the pick-up device can be moved back to the first location for picking up another article in the same manner.

While the various features of this invention are hereinafter described and illustrated as being particularly adapted for serially transferring cover members from a stack thereof to the open ends of product filled container bodies, it is to be understood that the various features of this invention can be utilized singly or in any combination thereof to provide transferring apparatus for other articles as desired.

Therefore, this invention is not to be limited to only the embodiments illustrated in the drawings, because the drawings are merely utilized to illustrate one of the wide variety of uses of this invention.

Other details, uses and advantages of the invention will become apparent as the following description of the present preferred embodiment thereof in the accompanying drawings proceeds.

BRIEF DESCRIPTION OF THE DRAWINGS

The accompanying drawings show the present preferred embodiment of the invention, in which:

FIG. 3 is an enlarged, fragmentary, cross-sectional view taken substantially on line 3—3 of FIG. 1 and illustrates the article transferring apparatus of this invention.

FIG. 4 is a fragmentary, cross-sectional view taken on line 4—4 of FIG. 3.

FIG. 5 is a fragmentary, cross-sectional view taken substantially on line 5—5 of FIG. 3 and illustrates part of the transferring apparatus in cross section and other parts thereof in elevation.

DESCRIPTION OF ILLUSTRATED EMBODIMENT

Figure 1:
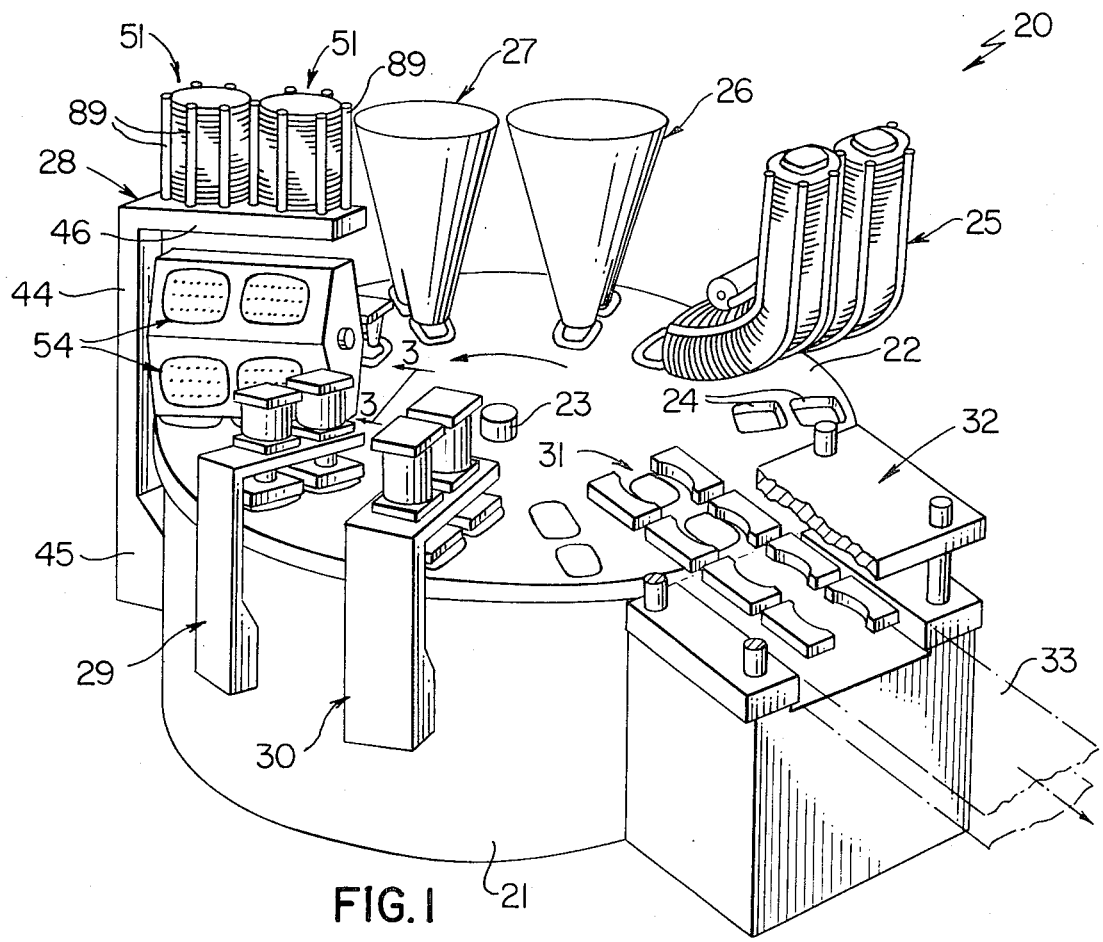
FIG. 1 is a perspective and schematic view illustrating a complete filling and sealing apparatus for container bodies, such apparatus including the cover member transferring apparatus of this invention.

Referring now to FIG. 1, an automatic apparatus for filling and sealing container bodies with food products and the like is generally indicated by the reference numeral 20 and comprises a base or frame structure 21 rotatably carrying an indexible and rotatable conveyor or table 22 adapted to be indexed by a rotatable shaft 23 so that container body receiving pockets 24 formed in the rotatable table 22 can be indexed in a counter-clockwise direction in FIG. 1 from a container body dispensing apparatus or station 25 to a first product filling station or apparatus 26, a second product filling station or apparatus 27, the cover member transferring and cover member tack sealing station or apparatus 28 which forms the features of this invention, a cover member depression forming station or apparatus 29, a cover member heat sealing station or apparatus 30 and a transfer station or apparatus 31 wherein the covered and sealed container bodies are transferred to a flange beading apparatus or station 32 for forming a curled annular bead about the sealed container body whereby the completed container constructions are adapted to be dispensed from the beading apparatus 32 to a desired location by conventional conveyor means 33.

Figure 2:
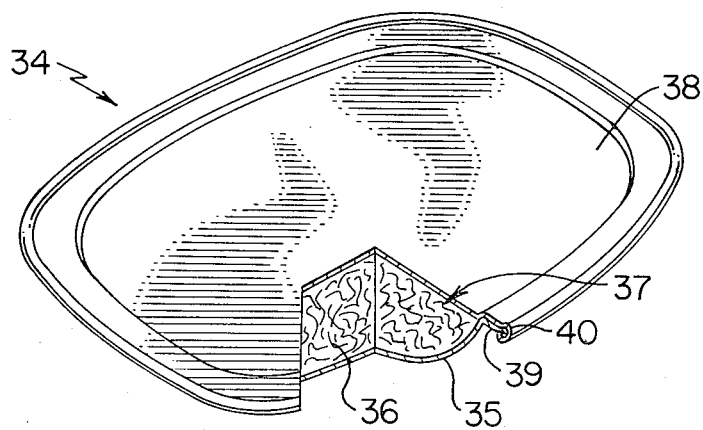
FIG. 2 is an enlarged perspective view, partially broken away, illustrating the completed container construction produced by the apparatus of FIG. 1.

The completed container construction made by the apparatus 20 of FIG. 1 is generally indicated by the reference numeral 34 in FIG. 2 and comprises a container body 35 filled with suitable product means 36 and sealed closed at its open end 37 by a cover member 38 which is heat sealed to an annular flange 39 of the container body 35 that surrounds the open end 37 thereof and is together with the cover member 38 suitably curled or beaded at 40 at a beading apparatus 32 of FIG. 1 to strengthen the combined cover member 38 and annular flange 39 at the outer edge thereof.

Figure 2A:
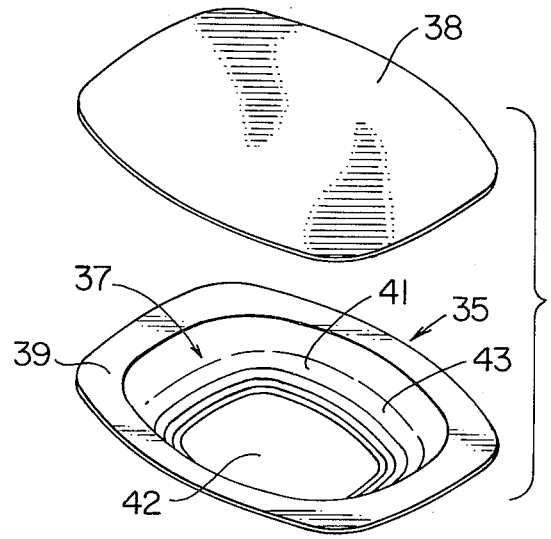
FIG. 2A is an exploded perspective view illustrating the cover member and container body before the cover member has been secured to the open end of the container body.

However, the container body 35 utilized in the pockets 24 of the table 22 is best illustrated in FIG. 2A wherein it can be seen that the annular flange 39 is originally substantially flat at the open end 37 of the container body 35 with the container body 35 having a bowl portion 41 defining a bottom wall 42 and an arcuate side wall 43 which is arcuate in any transverse cross-sectional configuration of the container body 35 between the bottom wall 42 and the flange 39. The cover member 38 as illustrated in FIG. 2A comprises a flat sheet of material.

If desired, the cooperating container body 35 and cover member 38 can be made of metallic foil containing aluminum and having a coating or layer of heat sealable material defining the inside surfaces of the container body 35 and cover member 38 so that the cover member 38 can be heat sealed to the flat flange 39 of the container body 35 to seal closed the open end 37 thereof.

As illustrated in FIGS. 3 and 5, the cover member transferring apparatus 28 of this invention includes an L-shaped support member or frame 44 having one leg 45 thereof secured at its lower end to the support or base 21 of the rotatable table 22 and its other arm or leg 46 disposed in cantilevered fashion above the table 22 so as to be in the path of movement of the container body receiving pockets 24 of the table 22 as will be apparent hereinafter. The arm 46 of the support 44 carries stationary and opposed frame members 47 and 48 respectively supporting a drive shaft 49 rotatably supported therein in suitable bearings 50 and adapted to be driven in synchronized relation to driving movement of the drive shaft 23 of the rotatable table 22 by suitable gearing or the like.

While the rotatable table 22 has pairs of side-by-side container body receiving pockets 24 so that the cover transferring apparatus 28 is adapted to simultaneously transfer two cover members 38 from adjacent stacks 51 thereof, it is to be understood that the features of this invention can be utilized for transferring cover members from only a single stack thereof or a plurality of side-by-side stacks thereof in the manner illustrated whereby only the mechanism for transferring cover members 38 from one of the stacks 51 thereof for the apparatus 28 will be described with the understanding that like structure and operation is provided for the other stack 51 of container cover members 38.

A rotatable carrier 52 is secured to the shaft 49 to be rotated in unison therewith between the support frame members 47 and 48, the carrier 52 having a plurality of flat surfaces 53 on the outer periphery thereof with the number of flat surfaces 53 being selected so the carrier 52 can carry a pick-up device 54 on every other flat surface 53 thereof. The embodiment of the apparatus 28 illustrated in the drawings has the carrier 52 provided with six pick-up devices 54 disposed about the outer periphery thereof as illustrated.

Each pick-up device 54 comprises a vacuum shoe 55 having a flat outer surface 56 suitably perforated with a plurality of apertures 57 leading to the interior of the shoe 55 so as to be adapted to be interconnected to a vacuum line 58 when suitable valve 59 thereof is opened to interconnect the respective vacuum line 58 to a drilled passage 60 in the shaft 49 that leads to a rotary coupling 61 that is interconnected to a vacuum source conduit 62. Thus, when the particular valve 59 of the vacuum line 58 for a particular vacuum shoe 55 is opened, the source of vacuum is interconnected to the interior of the vacuum shoe 55 so that a pressure differential is created across the flat surface 56 of the pick-up device 54 which will retain a cover member 38 thereto and permit the cover member 38 to be carried by such vacuum shoe or pick-up device 54 from a first station or location 63, FIG. 3, to a second station or location 64 where the pick-up device 54 is adapted to dispose the cover member 38 carried thereby on the open end 37 of a product filled container body 35 positioned at the station 64 by the rotatable table 22 as illustrated in FIG. 3. At such time, the valve 59 for the vacuum line 58 of the particular vacuum shoe 54 is closed and through suitable bleed means (not shown) the chamber inside the shoe 55 returns to atmospheric condition so that the cover member 38 releases from the surface 56 thereof to remain on the container body 35 at the flat flange 39 thereof.

Each vacuum shoe 55 has a plurality of rods 65 secured to the rear surface 66 thereof and respectively passing through suitable openings 67 in the carrier 52 which can be provided with suitable sleeve bearings 68 to permit sliding movement of the rods 65 relative thereto. However, each rod 65 carries a compression spring 69 having one end 70 thereof bearing against a washer-like retainer 71 having the rod 65 passing therethrough and abutting against the carrier 52 whereas the other end 72 of the compression spring 69 bears against a large retainer 73 carried or fixed on the rod 65 so that the force of the compression springs 69 tend to maintain their respective vacuum device 54 in its inner or retracted position relative to the carrier 52 as illustrated in FIG. 5.

Each pick-up device 54 also includes an enlarged rod 74 passing through a suitable opening 175 in the carrier 52 having a sleeve bearing 176 therein, the rod or member 74 being fastened to the under side 66 of the particular vacuum shoe 54 and having its free end 75 bifurcated to receive and secure a rotatable roller 76 therebetween. Each roller 76 is adapted to be engageable by a movable cam 77 carried by the stationary support frame 47 and provided with a slanting cam surface 78 which will bear against the roller 76 to cause the pick-up device 54 to be radially extended from the carrier 52 as the cam 77 is moved from left to right in FIG. 5. The cam 77 for each vacuum pick-up device 54 is interconnected to a piston rod 79 of a piston and cylinder arrangement 80 carried by the support frame 47 so that when the piston and cylinder arrangement 80 is activated to extend its piston rod 79 thereof to the right in FIG. 5, the cam 77 is moved to the right in FIG. 5 to cam against the roller 76 and thereby radially extend the particular pick-up device 54 relative to the carrier 52 in opposition to the force of the compression springs 69. Conversely, when such cam member 77 is retracted to the left in FIG. 5 from its previously described extended position by the piston and cylinder arrangement 80, the vacuum pick-up device 54 retracts toward the carrier 52 under the force of the compression springs 60 to the position illustrated in FIG. 5.

The support frame 47 carries an upper limit switch 81 and a lower limit switch 82 which are respectively adapted to be actuated by an L-shaped arm 83 secured to the carrier 52 adjacent its respective pick-up device 54 so that when the respective pick-up device 54 is disposed at the station or location 63 beneath the stack 51 of cover members 38 as illustrated by the upper pick-up device 54 in FIG. 5, the actuated limit switch 81 causes the piston and cylinder arrangement 80 to operate to extend the piston rod 79 to the right in FIG. 5 and, thereby, cam the respective pick-up device 54 radially upwardly to receive a cover member 38 from the stack 51 in a manner hereinafter described.

The carrier 52 adjacent the shaft 49 has a plate 182 thereon which carries a plurality of limit switches 183 such that the limit switch 183 for the particular vacuum shoe 54 being disposed at the station or location 63 is activated by an arm 84 carried by the stationary frame 47 with the actuated limit switch 183 opening the valve 59 in the vacuum line 58 for the respective vacuum pick-up device 54 so that the vacuum pick-up device 54 has a vacuum imposed therein from the time the same is indexed to the station 63 until the same is subsequently indexed to the station 64. At this time, the particular limit switch 183 is again engaged and activated by a lower stationary arm 84' which causes the limit switch 183 to close the valve 59 in the vacuum line 58 of the respective vacuum shoe 54 at the station 64 to disconnect the vacuum source therefrom.

The stroke of the upper piston and cylinder arrangement 80 can be so controlled that when the piston rod 79 is completely extended to the right, the vacuum shoe 54 at the location or station 63 can be moved radially upwardly a sufficient distance to cause a dispensing from the stack 51 in a manner hereinafter described. However, such rightward movement of the piston rod 79 of the piston and cylinder arrangement 80 illustrated in FIG. 5 can be terminated by a pin 85 carried by the piston rod cam 77 engaging against another limit switch 86 carried by a stationary arm 87 of the frame 47 which when activated will cause the piston and cylinder arrangement 80 to retract and thereby move the cam 77 back to the left. Such stationary arm 87 of the frame 47 also can be utilized to back-up the cam 77 during its back and forth movement relative to the frame 47.

The lower switch 82 on the stationary frame 47 when activated by the L-shaped arm 83 of the carrier 52 that is associated with a respective pick-up device 52, when that device 52 reaches the station 64 as illustrated in FIG. 5, controls a lower piston and cylinder arrangement 80' which has its piston rod 79' interconnected to a cam member 77' that has a sliding cam surface 78' for acting against the roller 76 of the pick-up device 54 at the station 64 in the same manner as the cam 77 previously described. For example, with the limit switch 82 activated by the arm 83 at the station 64, the cam member 77' is moved to the right to move the pick-up device 54 vertically downwardly in opposition to the force of the compression springs 69 so as to cause the cover member 38 carried thereby to be placed on the open end 37 of the container body 35 disposed at the station 64. The extent of movement of the cam 77' to the right in FIG. 5 can be controlled by the stroke of the piston and cylinder arrangement 80' or the same may be controlled by a limit switch 86' being carried by a stationary arm 87' of the stationary frame 47 and being activated by a drive pin 85' carried by the cam 77' in the same manner as the drive pin 85 previously described.

Simultaneously with the activation of the limit switch 82 by the arm 83 for a particular vacuum device 52 being disposed at the station 64, the limit switch 183 for the valve 59 of that particular vacuum device 52 at the station 64 is actuated by the arm 84' to disconnect the vacuum source from the vacuum shoe 55 so that the pick-up device 54 can release the cover member 38 being carried thereby.

The stack 51 of cover members 38 for the transfer device 28 includes a chute structure 88 formed from a plurality of rods 89 secured to the cantilevered arm 46 of the stationary support frame 44 and having lower ends 90 defining a lower open end 91 of the chute structure 88 whereby the stacks 51 of cover members 38 are adapted to be guided vertically downwardly between the rods 89 to the lower open end 91 of the chute 88. However, a pair of opposed flange members 92 and 93 are carried by the chute structure 88 so as to extend inwardly over the open end 91 of the chute structure 88 for holding the stacks 51 of cover members 38 in the chute structure 88.

Figure 6:
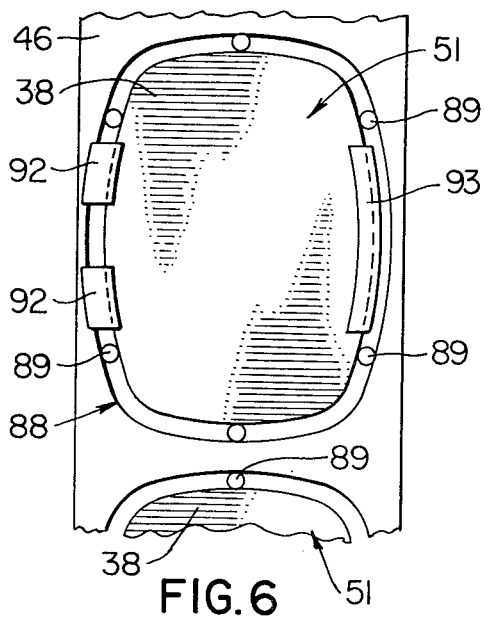
FIG. 6 is an end view of the lower end of the cover member supply chute of the apparatus of FIG. 3 and is taken substantially on line 6—6 thereof.
Figure 7:
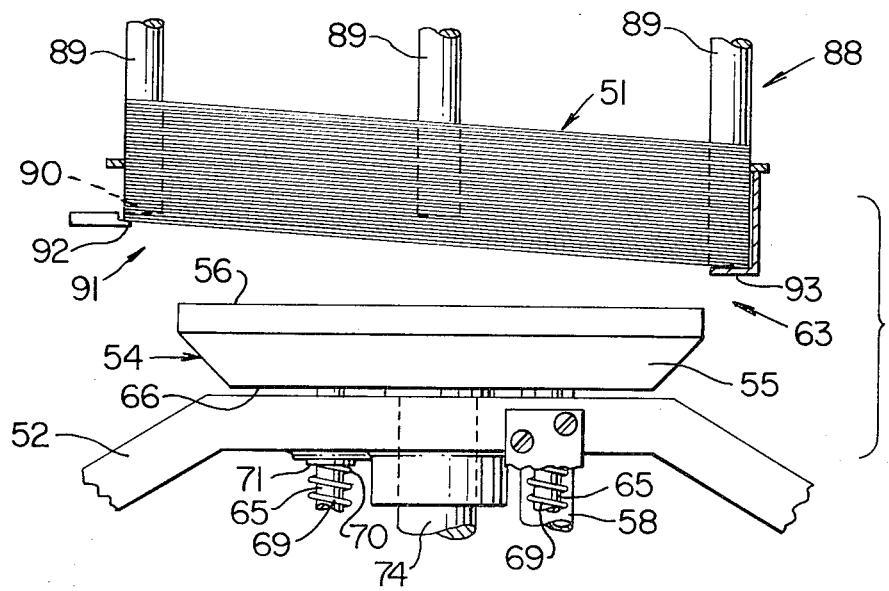
FIG. 7 is a fragmentary side view of the apparatus illustrated in FIG. 3 with one of the pick-up devices to be extended toward the cover member chute and before the same engages against the lowermost cover member thereof.

In particular, the flange member 92 for a respective stack 51 as illustrated in FIGS. 3 and 6 extends inwardly over the open end 91 of the chute structure 88 only for a short distance whereas the flange 93 at the opposed side of the open end 91 of the chute 88 extends inwardly a greater distance with the flange 92 being vertically spaced above the flange 93 so that the respective stack 51 of cover members 38 are tilted at the open end 91 of the chute 88 as fully illustrated in FIG. 7.

Without imposing any limitation of this invention, and merely for the purpose of illustration, it has been found that when the cover members are formed of the aforementioned aluminum foil of approximately 0.0025 of an inch thick, the higher flange 92 can extend inwardly over the open end 91 of the chute structure 88 approximately one-sixteenth of an inch whereas the flange 93 can extend inwardly across the open end 91 of the chute 88 for approximately one-quarter of an inch. With such dimensions, the upper flange 92 can be disposed approximately one-quarter of an inch above the flange 93 in the vertical direction.

The operation of the article transferring apparatus and method 28 of this invention will now be described.

Figure 8:
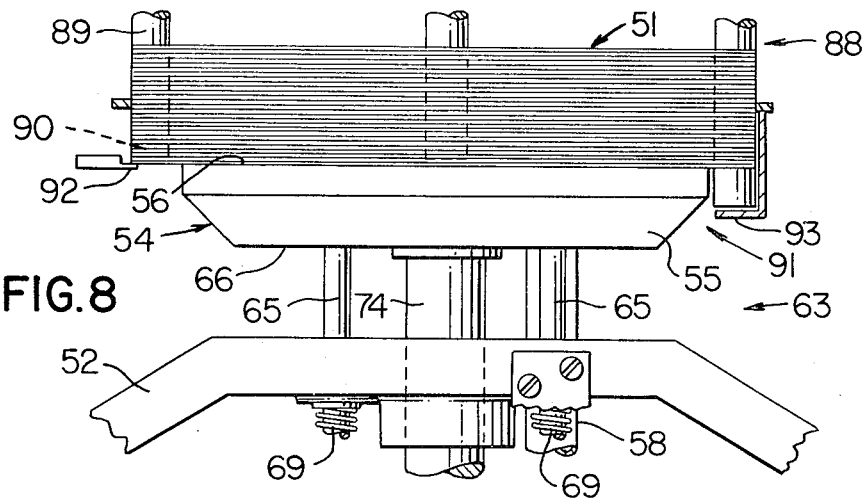
FIG. 8 is a view similar to FIG. 7 and illustrates the pick-up device in its fully extended position.
Figure 9:
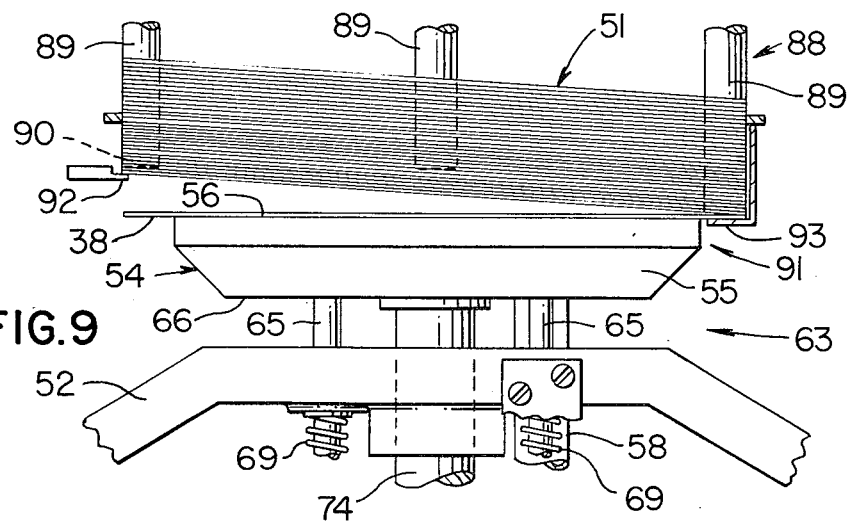
FIG. 9 is a view similar to FIG. 7 and illustrates the pick-up device as the same is beginning its retracting operation.
Figure 10:
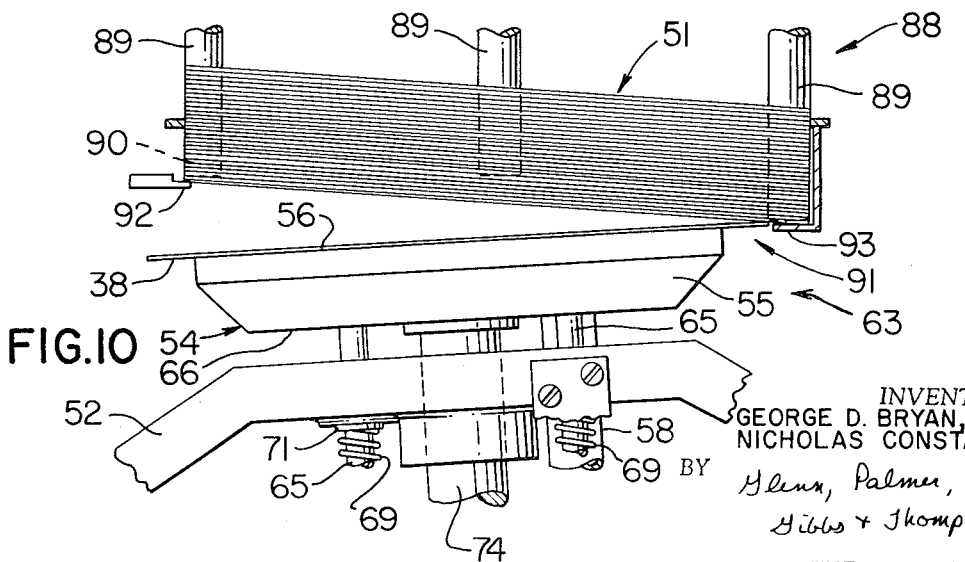
FIG. 10 is a view similar to FIG. 7 and illustrates the final dispensing of the lowermost cover member from the supply chute of the transferring apparatus of this invention.

When the drive shaft 49 has indexed the carrier 52 so as to bring a particular pick-up device 54 to the station or location 63 in the manner illustrated in FIG. 7, at which time further rotation of the shaft 49 and table 22 are momentarily stopped, the limit switches 81 and 183 are actuated respectively by the arms 83 and 84 so as to cause the upper cam 77 to move to the right in FIG. 5 and cam the vacuum device 54 at the station 63 vertically upwardly so that the same engages against the lowermost container 38 in the stack 51 in the chute 88 and move the stack 51 upwardly to right the same until the pick-up device 54 has been fully extended from the carrier 52 as illustrated in FIG. 8. At this time, the surface 56 of the extended pick-up device 54 has at least been extended upwardly to cause the lowermost container 38 to be horizontally disposed at the level of the upper flange 92 as illustrated in FIG. 8. Since the limit switch 183 has been actuated by the arm 84, the vacuum source has been interconnected to the shoe 54 at the station 63 and the pressure differential acting across the lowermost cover member 38 at the surface 56 of the extended pick-up device 54 causes the lowermost cover member 38 to be secured to the surface 56 of the pick-up device 54 whereby subsequent retracting of the pick-up device 54 by deactuation of the piston and cylinder arrangement 80 causes the lowermost cover member 38 to move vertically downwardly with the pick-up device 54 and, thus, force past the shorter flange 92 as illustrated in FIG. 9. However, as the downward movement of the pick-up device 54 continues from the position illustrated in FIG. 9 to the position illustrated in FIG. 10 where the pick-up device 54 has not retracted sufficiently to carry the lowermost cover member 38 below the larger flange 91, the shaft 49 begins to rotate the carrier 52 and, thus, the pick-up device 54 to thereby cause the vacuum attached and lowermost cover member 38 to move sideways from the flange 93 and be carried by the shoe 54 from the station 63 toward the station 64 by the indexing carrier 52.

Of course, it can be seen that each indexing movement of the carrier 52 in FIG. 3 in a counterclockwise direction is approximately 60° so that the cover members 38 are serially picked up at the chute 88 by the devices 54 and are subsequently brought to the station 64 whereby when a particular pick-up device 54 is brought to the station 64, the limit switches 82 and 183 therefor are respectively actuated by the arms 83 and 84' to cause the pick-up device 54 to be extended downwardly toward the product filled container body 35 and place the cover member 38 on the open end 37 thereof.

During such depositing of a cover member 38 on the open end 37 of a product filled container body 35, suitable mechanism can be utilized to tack seal such cover member 38 to the container body 35 while the pick-up device 54 is disposed against the open end 37 of the container body 35, if desired.

In particular, reference is now made to FIG. 3 wherein suitable tack sealing structure 94 is provided on each side of a container body 35 at the station 64 with each tack sealing structure 94 comprising a rotatable rod 95 carrying one or more tack sealing members 96 thereon which have suitable ends 97 for engaging against the cover member 38 and, through suitable heating means, tack seal the same to the flange 39 of the container body 35 when such tack sealing members 96 have been rotated by the rod 95 to the full line position illustrated in FIG. 3 from their normally out of the way dotted line position illustrated in FIG. 3.

At the same time that the tack sealing members 96 are tack sealing the cover member 39 to the container body 35 as illustrated in FIG. 3, the vacuum device 54 at the station 64 can be retracted whereby the tack sealers 96 assure that the cover member 38 will be released from the surface 56 thereon during such retracting movement of the pick-up device 54 at the station 64.

Thus, the retracted pick-up device 54 at the station 64 is subsequently indexed by the carrier 52 back to the station 63 to receive another cover member 38 thereon to again be moved to the station 64.

Thus, it can be seen that this invention provides an improved method and apparatus for serially transferring articles from a first location to a second location, such articles comprising cover members for closing the open ends of product filled container bodies, if desired.

It is to be understood that while this invention has been described in connection with a rotatable table 22, such embodiment of the conveyor 22 is merely for the purpose of illustrating one type of conveyor that can be utilized and is not for the purpose of placing any specific limitations on this invention whereby it is to be further understood that the various features of this invention can be utilized with any other type of suitable conveyor, such as a straight line conveyor where each operating station of the apparatus of FIG. 1 would be in an aligned relation along such a straight line conveyor of the continuous belt type or of other configuration and structure.

While a present preferred embodiment of the invention and method for practicing the same has been illustrated and described, it will be recognized that the invention may be otherwise variously embodied and practiced within the scope of the following claims.

What is claimed is:

1. In a container closing apparatus, a cover member transferring device for transferring a cover member from a first location to a second location where a container body is to receive said transferred cover member for closing the same, said transferring device comprising a support frame, a rotatable carrier supported by said frame and being movable relative thereto in a fixed substantially circular path from adjacent said first location to adjacent said second location, a pick-up device movably carried by said carrier for radially outward and inward movements relative thereto, said carrier having means for extending and retracting said pick-up device, said extending and retracting means extending said pick-up device radially outwardly when said pick-up device is adjacent said first location to pick up a cover member at said first location and thereafter retract said pick-up device adjacent said first location, and means for moving said carrier in said fixed path so that said carrier moves said pick-up device from adjacent said first location to adjacent said second location, said extending and retracting means extending said pick-up device radially outwardly adjacent said second location for depositing said cover member on a container body at said second location and thereafter retract said pick-up device radially inwardly adjacent said second location, said cover member transferring device having a cover member storage device at said first location, said storage device having means for serially dispensing said cover members to said pick-up device as said pick-up device is extended adjacent said first location, said cover member storage device having a chute for receiving a stack of said cover members, said chute having an open lower end for serially dispensing said cover members from said stack thereof and having stationary means at said lower end for holding said stack so that said cover members can be serially dispensed by said pick-up device, said stationary means for holding said stack of cover members at said open lower end of said chute comprising a pair of fixed opposed supports extending partly across said open end and on which the lowermost cover member of said stack rests at opposed ends thereof, said opposed supports of said chute being vertically offset relative to each other so that said stack of cover members is tilted relative to the horizontal when resting on said supports.

2. In a container closing apparatus as set forth in claim 1, said pick-up device when extended from said carrier adjacent said first location engaging against the lowermost cover member at said open end of said stack and moving said stack upwardly to untilt the same to at least the level of the higher support.

3. In a container closing apparatus as set forth in claim 2, said pick-up device having means for securing said lowermost cover member thereto at least when said pick-up device is fully extended adjacent said first location so that as said pick-up device is subsequently retracted adjacent said first location, said lowermost cover member is forced past higher support at the respective end of said cover member before the other end of said cover member clears the other support.

4. In a container closing apparatus, a cover member transferring device for transferring a cover member from a first location to a second location where a container body is to receive said transferred cover member for closing the same, said transferring device comprising a support frame, a rotatable carrier supported by said frame and being movable relative thereto in a fixed substantially circular path from adjacent said first location to adjacent said second location, a pick-up device movably carried by said carrier for radially outward and inward movements relative thereto, said carrier having means for extending said pick-up device radially outwardly therefrom when said pick-up device is adjacent said first location to pick up a cover member at said first location and thereafter retract said pick-up device adjacent said first location, and means for moving said carrier in said fixed path so that said carrier moves said pick-up device from adjacent said first location to adjacent said second location, said carrier having said means for extending said pick-up device operating to extend said pick-up device radially outwardly adjacent said second location for depositing said cover member on a container body at said second location and thereafter retract said pick-up device radially inwardly adjacent said second location, said cover member transferring device having a cover member storage and supporting device at said first location, said storage device having a pair of vertically offset stationary supports for holding a vertically arranged stack of said cover members so that said cover members are tilted relative to the horizontal when resting on said stationary supports and with the lowermost cover member of said stack having its opposed ends resting on said stationary supports, said pick-up device when extended from said carrier adjacent said first location engaging against the lowermost cover member at said open end of said stack and moving said stack upwardly to untilt the same to at least the level of the higher stationary support, said pick-up device having means for securing said lowermost cover member thereto at least when said pick-up device is fully extended adjacent said first location so that as said pick-up device is subsequently retracted adjacent said first location said lowermost cover member is forced past said higher stationary support at the respective end of said cover member during the first portion of retracting movement whereupon said moving means for said carrier commences rotation thereof prior to retraction of said lowermost cover member past said other stationary support to thereby utilize said rotation to extract the other end of said cover member from between the other stationary support and on adjoining cover member.

* * * * *